(12) United States Patent
Ogawa et al.

(10) Patent No.: US 8,122,154 B2
(45) Date of Patent: Feb. 21, 2012

(54) STORAGE SYSTEM

(75) Inventors: Junji Ogawa, Yokohama (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 12/342,918

(22) Filed: Dec. 23, 2008

(65) Prior Publication Data

US 2009/0157862 A1 Jun. 18, 2009

Related U.S. Application Data

(63) Continuation of application No. 11/007,093, filed on Dec. 7, 2004, now abandoned.

(30) Foreign Application Priority Data

Oct. 13, 2004 (JP) .................... 2004-298776

(51) Int. Cl.
*G06F 15/16* (2006.01)
*G06F 1/12* (2006.01)
*G04C 11/00* (2006.01)
*G05F 7/00* (2006.01)

(52) U.S. Cl. ........... 709/248; 713/400; 368/46; 707/788

(58) Field of Classification Search .................. 709/223, 709/248; 713/178, 400; 707/102, 788
See application file for complete search history.

(56) References Cited

U.S. PATENT DOCUMENTS

| | | | |
|---|---|---|---|
| 5,444,780 A | 8/1995 | Hartman, Jr. | |
| 5,500,897 A | 3/1996 | Hartman, Jr. | |
| 5,689,688 A | 11/1997 | Strong et al. | |
| 5,907,685 A | 5/1999 | Douceur | |
| 6,185,661 B1 | 2/2001 | Ofek et al. | |
| 6,199,169 B1 | 3/2001 | Voth | |

(Continued)

FOREIGN PATENT DOCUMENTS

JP    06-348660 A    12/1994

(Continued)

OTHER PUBLICATIONS

RFC 1305—Network Time Protocol (Version 3) Specification, Implementation and Analysis, David L. Mills, Network Wroking Group, Mar. 1992, pp. 5-8. http://tools.ietf.org/html/rfc1305.*

(Continued)

*Primary Examiner* — Saleh Najjar
*Assistant Examiner* — Tae Kim
(74) *Attorney, Agent, or Firm* — Kilpatrick Townsend & Stockton LLP

(57) ABSTRACT

In a storage system that manages update prohibition (WORM) information, when time management is not performed with precision, there arises a possibility that an update prohibition (WORM) attribute may be erased before a preservation period expires. This invention provides a storage system coupled to at least one of time servers through a network, including: a first time information holding unit that holds first time information to be used to manage an update prohibition attribute of data; a second time information holding unit that holds second time information to be used to establish time synchronization with a device coupled to the network; and a time update unit that manages the first time information and the second time information, in which the time update unit receives third time information from the at least one of the time servers and judges whether the third time information satisfies a predetermined condition, and updates the first time information based on the third time information when the third time information satisfies the predetermined condition.

14 Claims, 12 Drawing Sheets

U.S. PATENT DOCUMENTS

| | | | |
|---|---|---|---|
| 6,311,283 B1* | 10/2001 | Gonzalez | 713/400 |
| 6,530,023 B1 | 3/2003 | Nissl et al. | |
| 6,581,110 B1 | 6/2003 | Harif et al. | |
| 7,065,679 B2 | 6/2006 | Nakamura et al. | |
| 7,263,036 B2* | 8/2007 | Shirakawa | 368/46 |
| 7,266,714 B2 | 9/2007 | Davies et al. | |
| 2002/0032856 A1 | 3/2002 | Noguchi et al. | |
| 2003/0105890 A1* | 6/2003 | Sakuma | 710/1 |
| 2003/0149746 A1 | 8/2003 | Baldwin et al. | |
| 2003/0172145 A1* | 9/2003 | Nguyen | 709/223 |
| 2003/0221138 A1* | 11/2003 | Shirakawa | 713/400 |
| 2003/0233553 A1* | 12/2003 | Parks et al. | 713/178 |
| 2004/0028162 A1 | 2/2004 | Skahan, Jr. et al. | |
| 2005/0177591 A1* | 8/2005 | Kanda et al. | 707/102 |
| 2005/0208803 A1 | 9/2005 | Rohatgi et al. | |
| 2005/0223297 A1 | 10/2005 | Nakamura et al. | |

FOREIGN PATENT DOCUMENTS

| | | |
|---|---|---|
| JP | 07-013705 A | 1/1995 |
| JP | 2002-183325 A | 6/2002 |
| JP | 2002-312737 A | 10/2002 |
| JP | 2003-169377 A | 6/2003 |

OTHER PUBLICATIONS

Japan Patent Office (JPO) office action for JPO patent application JP2004-298776 (Dec. 22, 2009).

RFC 1305—Network Time Protocol (Version 3) Specification, Implementation and Analysis, David L. Mills, Network Wroking Group, Mar. 1992, pp. 5-8, http://tools.ietf.org/html/rfc1305.

* cited by examiner

WORM MANAGEMENT CLOCK MANAGEMENT INFORMATION 213

| ITEM | VALUE |
| --- | --- |
| 221 CHECK INTERVAL | 10 MINUTE |
| 222 ALLOWABLE CORRECTION DEGREE | (-2 SECOND, + 0 SECOND) / 10 MINUTE |
| 223 TIME OF LAST UPDATE | 12:34:56 |
| 224 CORRECTION AT THE TIME OF LAST UPDATE | 0 |
| 225 TIME OF UPDATE BEFORE LAST | 12:24:56 |
| 226 CORRECTION AT THE TIME OF UPDATE BEFORE LAST | -1 SECOND |
| ⋮ | ⋮ |

FIG.4

WORM MANAGEMENT CLOCK MANAGEMENT INFORMATION

702

| ITEM | VALUE |
|---|---|
| CHECK INTERVAL (711) | 10 MINUTE |
| FIRST AUTHENTICATION FUNCTION-EQUIPPED NTP SERVER IP ADDRESS (712A) | xxx.xxx.xxx.xxx |
| FIRST AUTHENTICATION FUNCTION-EQUIPPED NTP SERVER PUBLIC KEY (713A) | xxxxx... |
| SECOND AUTHENTICATION FUNCTION-EQUIPPED NTP SERVER IP ADDRESS (712B) | yyy.yyy.yyy.yyy |
| SECOND AUTHENTICATION FUNCTION-EQUIPPED NTP SERVER PUBLIC KEY (713B) | yyyyy... |
| ⋮ | ⋮ |
| | |
| | |

*FIG.9*

STORAGE SYSTEM

CROSS-REFERENCES TO RELATED APPLICATIONS

This application is a continuation of commonly assigned and co-pending U.S. patent application Ser. No. 11/007,093, filed Dec. 7, 2004, entitled "Storage System", the entire disclosure of which is incorporated herein by reference.

The current application claims priority from U.S. patent application Ser. No. 11/007,093, filed Dec. 7, 2004, which in turn claims priority from Japanese Patent Application No. P2004-298776, filed Oct. 13, 2004, the entire disclosure of which is incorporated herein by reference.

BACKGROUND OF THE INVENTION

This invention relates to a storage system, in particular, management of data whose preservation period is determined.

In a computer system comprising plural devices such as computers, it is required to establish synchronization of a time held by each device constituting the system. For instance, the time is used to create logs to be obtained in the computer system. With the logs, various situations, such as an influence exerted by an operation of a certain device on another device, are grasped.

In general, in order to establish time synchronization in the computer system, an NTP (Network Time Protocol) server is used. In other words, one of the devices in the computer system is set as the NTP server and transmits time information to each of the other devices, thereby allowing every device in the computer system to obtain the same time.

Meanwhile, among data stored in a storage system, there is data whose preservation for a certain period of time is obligated. Such data is, for instance, audit target data in a specific category of business.

There is a method with which a WORM (Write Once Read Many) attribute, in other words, an update prohibition attribute is given to such data at the time of storage, thereby proving that the data determined once is not erased or tampered and ensuring the correctness of the data.

In general, the WORM is a property possessed by write-once optical disks and the like (CD-Rs, for instance). Therefore, by storing data on such write-once media, the WORM attribute is realized with ease.

Aside from this, from the viewpoint of performance and the like, a method is also proposed with which the WORM is realized in a storage system comprising a magnetic disk.

In JP 07-13705 A, a method is disclosed with which overwriting of data on a disk is prevented by providing a writing prohibition flag or the like on the disk.

BRIEF SUMMARY OF THE INVENTION

When a WORM attribute is virtually given to a medium, such as a magnetic disk, that does not originally possess a WORM attribute, it is possible to set a term (WORM guarantee term) for the WORM attribute. In this case, the WORM attribute can be reset when the set term expires.

In the case of data whose preservation for a certain period of time is obligated, for instance, once the period of time ends, an area used to store the data can be used for another purpose. Therefore, it becomes possible to use the storage area with efficiency.

On the other hand, as is different from the case of the write-once optical disks and the like where the WORM attribute is maintained by the property of the media, when a cyber attack is made by a person on a portion that manages the WORM attribute, in particular, a portion that manages a time relating to a designated period of time, the WORM attribute may be changed before the designated period of time expires.

When the time of a clock that is referred to at the time of the management of the WORM attribute is intentionally or erroneously advanced, for instance, there arises a danger that data, whose WORM guarantee term has not yet expired in actuality, may be updated.

In order to solve such a problem, it is possible to manage the time for the WORM management by completely hiding the time from users. In this case, however, time synchronization can not be established in a computer system that the users use.

Also, in this case, an innocent administrator can not correct a time deviation occurred due to a hardware reason.

This invention provides a storage system coupled to at least one of time servers through a network, including: a first time information holding unit that holds first time information to be used to manage an update prohibition attribute of data; a second time information holding unit that holds second time information to be used to establish time synchronization with a device coupled to the network; and a time update unit that manages the first time information and the second time information, in which the time update unit receives third time information from the at least one of the time servers and judges whether the third time information satisfies a predetermined condition, and updates the first time information based on the third time information when the third time information satisfies the predetermined condition.

According to this invention, it becomes possible to realize a storage system that reliably protects data, whose WORM guarantee term has not yet expired.

BRIEF DESCRIPTION OF THE DRAWINGS

FIG. 4 is an explanatory diagram of WORM management clock management information according to the first embodiment of this invention.

FIG. 9 is an explanatory diagram of WORM management clock management information according to the second embodiment of this invention.

DETAILED DESCRIPTION OF THE INVENTION

Figure 1:
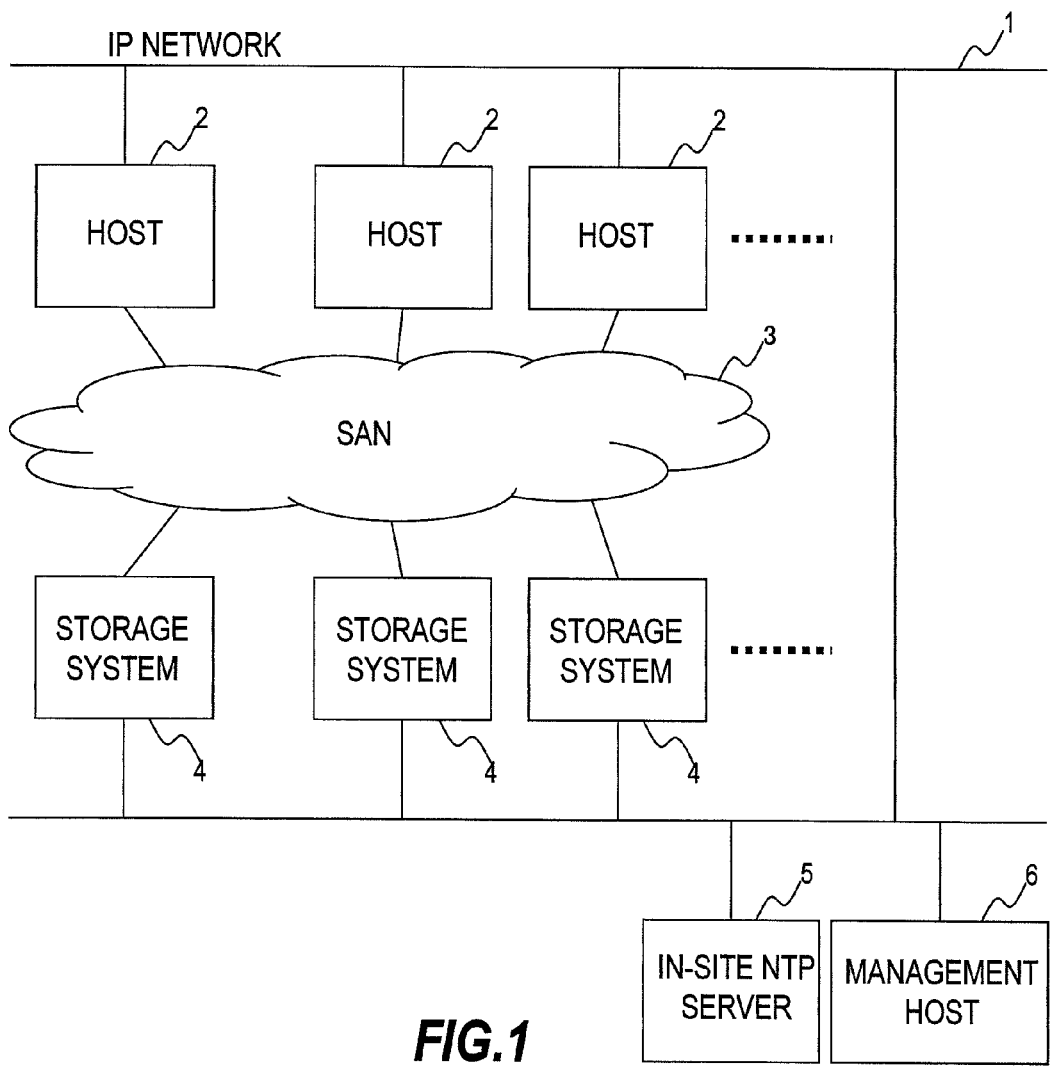
FIG. 1 is a block diagram showing a configuration of a computer system according to a first embodiment of this invention.

FIG. 1 is a block diagram showing a configuration of a computer system according to a first embodiment of this invention.

Each host 2 is a computer that is connected to each storage system 4 through a storage area network (SAN) 3. The host 2 accesses data stored in the storage system 4 using a block I/O interface or a file I/O interface.

In addition, the host 2 is connected to the storage system 4 through an IP network 1. The host 2 may access the data stored in the storage system 4 through the IP network 1.

In the storage system 4, data is stored. To the data stored in the storage system 4, a WORM (Write Once Read Many) attribute or an update prohibition attribute may be given. Further, a term (WORM guarantee term) can be set in which the WORM attribute should be maintained. When the WORM guarantee term is set for data, the host 2 or the like can not update the data before the WORM guarantee term expires.

An in-site NTP server 5 is a computer that is connected to the host 2, the storage system 4, and a management host 6 through the IP network 1. The in-site NTP server 5 functions as a time server that transmits time information to each of the devices connected to the IP network 1 using an NTP. Each of the devices connected to the IP network 1 synchronizes the time of its internal clock to the time information received from the in-site NTP server 5.

The management host 6 is a computer comprising an input/output device (not shown). The management host 6 is connected to the host 2, the storage system 4, and the in-site NTP server 5 through the IP network 1 and manages those devices.

Figure 2:
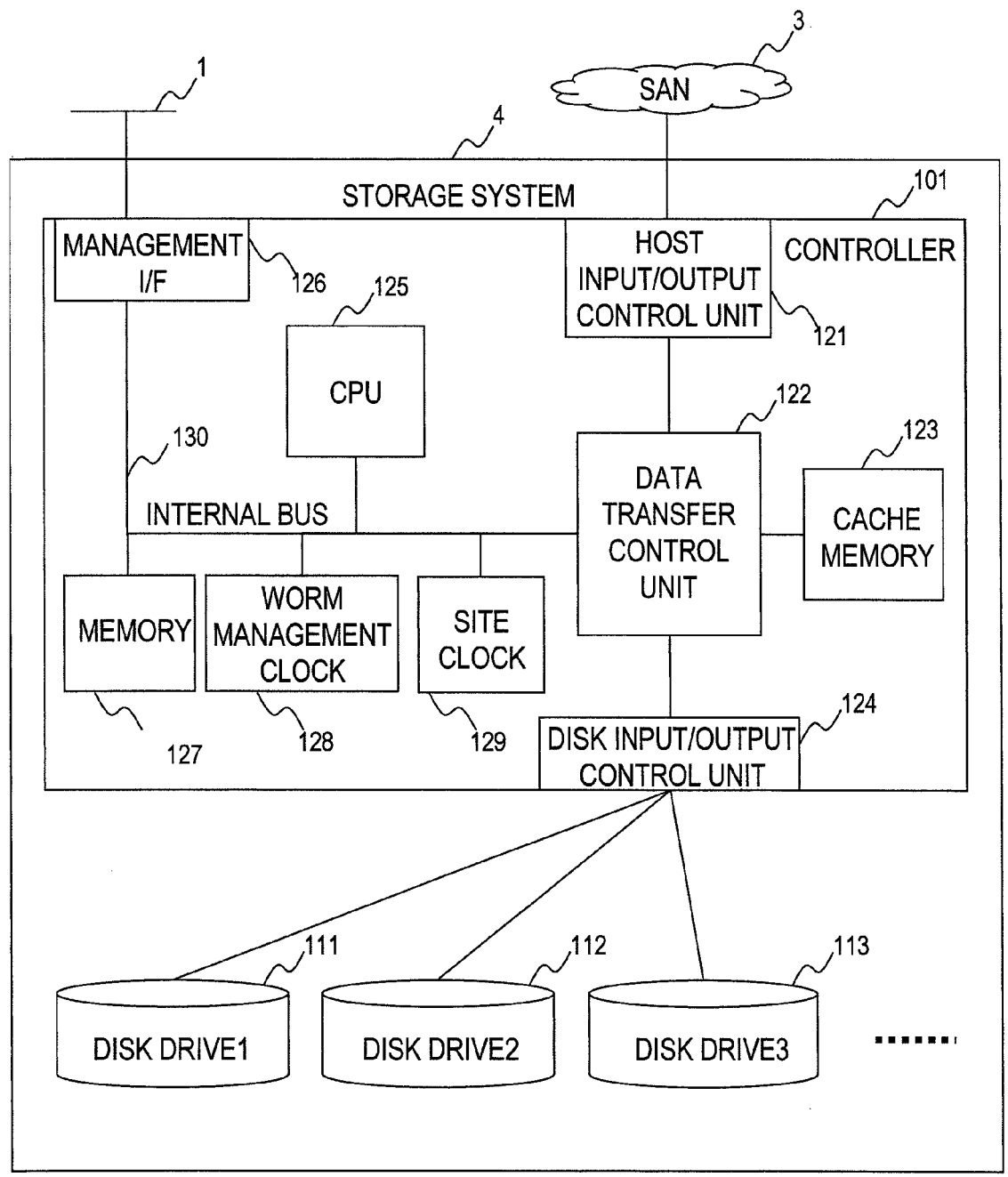
FIG. 2 is a block diagram showing a configuration of a storage system according to the first embodiment of this invention.

FIG. 2 is a block diagram showing a configuration of the storage system 4 according to the first embodiment of this invention.

The storage system 4 comprises disk drives 111 to 113 and a controller 101.

In the disk drives 111 to 113, data is stored.

The controller 101 manages the data stored in the disk drives 111 to 113. The controller 101 comprises a host input/output control unit 121, a data transfer control unit 122, a cache memory 123, a disk input/output control unit 124, a CPU 125, a management I/F 126, a memory 127, a WORM management clock 128, a site clock 129, and an internal bus 130.

The host input/output control unit 121 is an interface that communicates with the host 2 through the SAN 3. For instance, the host input/output control unit 121 exchanges data and a control signal with the host 2 and the like using a fibre-channel protocol or an iSCSI protocol. In addition, the host input/output control unit 121 performs conversion of protocols used outside and inside the storage system 4.

The cache memory 123 is, for instance, a semiconductor memory and temporarily stores data to be exchanged between the host input/output control unit 121 and the disk input/output control unit 122.

The data transfer control unit 122 controls data transfer between the CPU 125, the host input/output control unit 121, the disk input/output control unit 124, and the cache memory 123. In addition, for data guarantee, the data transfer control unit 122 adds a guarantee code to data to be transferred.

The disk input/output control unit 124 is an interface with respect to the disk drives 111 to 113. For instance, the disk input/output control unit 124 exchanges data and a control signal with the disk drive 111 and the like using an interface of ATA, SAS (Serial Attached SCSI), fibre channel, or the like. In addition, the disk input/output control unit 124 performs conversion of protocols used outside and inside the controller 101.

In other words, the data transfer control unit 122 transfers data to be read/written from/into the disk drive 111 or the like by the host 2 between the host input/output control unit 121 and the disk input/output control unit 124. In addition, the data transfer control unit 122 transfers the data to the cache memory 123.

The management interface (I/F) 126 is an interface with respect to the IP network 1. The management I/F 126 exchanges data and a control signal with the management host 6 and the like using a TCP/IP protocol.

In the memory 127, a control program is stored. The CPU 125 reads the control program from the memory 127 and executes it, thereby realizing various kinds of processing. In addition, in the memory 127, management information to be used at the time of execution of the control program is stored.

The WORM management clock 128 is used to manage the WORM attribute given to the data stored in the storage system 4. More specifically, the WORM management clock 128 is referred to at the time when judging whether the WORM guarantee term has expired.

The site clock 129 manages a time (in-site time) used to establish synchronization of the respective devices in the computer system.

In this embodiment, the WORM management clock 128 and the site clock 129 are mutually independent clocks. However, this invention is not limited to such mutually independent clocks and it is sufficient that these clocks each hold time information.

For instance, the WORM management clock 128 may be a clock and the site clock 129 may be a storage area on the cache memory 123 in which information showing a difference between a time indicated by the WORM management clock 128 and the in-site time is stored. In this case, the time indicated by the site clock 129 is a value obtained by adding the difference stored in the storage area to the time indicated by the WORM management clock 128.

Alternatively, the site clock 129 may be a clock and the WORM management clock 128 may be a storage area on the cache memory 123.

The internal bus 130 connects the units, such as the CPU 125, in the controller 101 to each other in a communicable manner.

The disk drives 111 to 113 constitute a disk array. In the example shown in FIG. 2, only three disk drives are provided, although it is possible to provide the storage system 4 with an arbitrary number of disk drives.

Figure 3:
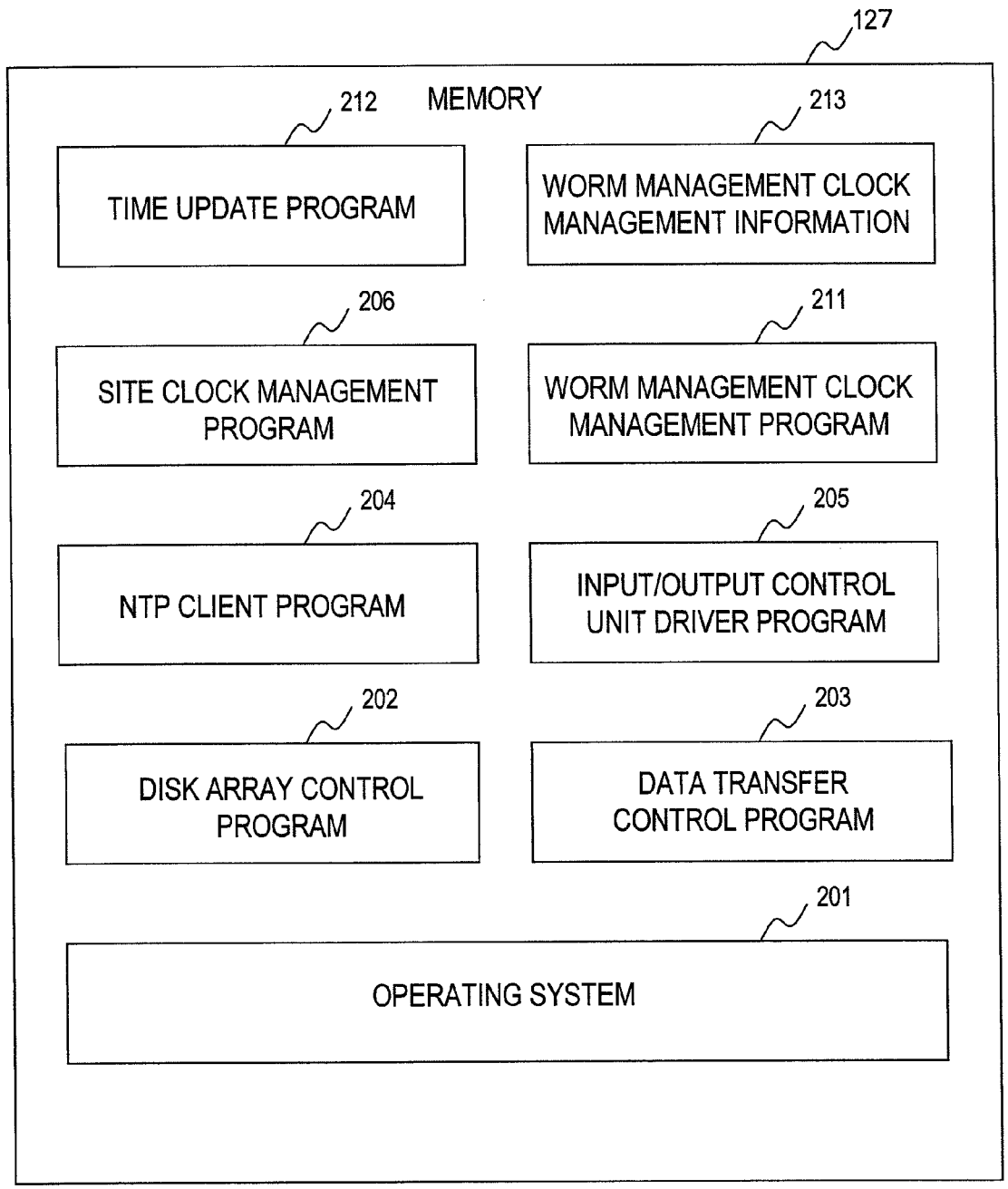
FIG. 3 is an explanatory diagram of a memory according to the first embodiment of this invention.

FIG. 3 is an explanatory diagram of the memory 127 according to the first embodiment of this invention.

In the memory 127, the control program and the management information are stored. Various kinds of processing are realized through execution of the control program by the CPU 125. More specifically, in the memory 127, an operating system 201, a disk array control program 202, a data transfer control program 203, an NTP client program 204, an input/output control unit driver program 205, a site clock management program 206, a WORM management clock management program 211, a time update program 212, and WORM management clock management information 213 are stored.

The operating system 201 is a basic program that causes each control program to operate.

The disk array control program 202 controls input/output of data into/from the disk drive 111 or the like according to a data input/output request from the host 2 or the like. More specifically, the disk array control program 202 performs control of the disk array such as RAID conversion or logical-physical address conversion.

The data transfer control program 203 performs data transfer by controlling the data transfer control unit 122.

The NTP client program 204 interprets data issued from the in-site NTP server 5 using the NTP, thereby obtaining time information. The obtained time information is used to update the WORM management clock 128 and the site clock 129.

The input/output control unit driver program 205 controls the host input/output control unit 121 and the disk input/output control unit 124.

The site clock management program 206 updates the site clock 129 according to an instruction from the time update program 212 or an instruction from an administrator.

When time update is requested by the time update program 212 or the like, the WORM management clock management program 211 judges whether the requested update should be permitted or prohibited by referring to the WORM management clock management information 213. Following this, when it is judged that the update should be permitted, the WORM management clock management program 211 updates the WORM management clock 128.

The time update program 212 updates the site clock 129 and the WORM management clock 128 by controlling the NTP client program 204, the site clock management program 206, and the WORM management clock management program 211 with reference to the WORM management clock management information 213. An operation of the time update program 212 will be described in detail later with reference to FIG. 6.

FIG. 4 is an explanatory diagram of the WORM management clock management information 213 according to the first embodiment of this invention.

The WORM management clock management information 213 contains various items named "check interval" 221 showing intervals at which the WORM management clock is updated, "allowable correction degree" 222 showing an allowable correction degree at the time of the update, "time of the last update" 223 showing a time at which the last update was made, "correction at the time of the last update" 224 showing a correction degree at the time of the last update, "time of the update before last" 225 showing a time at which the update before last was made, and "correction at the time of the update before last" 226 showing a correction degree at the time of the update before last. The WORM management clock management information 213 may contain an update time and a correction degree of an update further preceding the update before last.

In this embodiment, the check interval 211 is fixed (at 10 minutes) and the WORM management clock 128 is updated at regular intervals, although the WORM management clock 128 may be updated at random intervals. With the random update intervals, robustness against time tampering by a malicious administrator is improved.

In the example shown in FIG. 4, the allowable correction degree 222 is set in a range of from −2 seconds to +0 second per 10 minutes. In other words, it is prohibited that the time is delayed by more than 2 seconds per 10 minutes. Also, regardless of the correction degree, it is prohibited that the time is advanced.

Here, the correction degree is a degree by which the time is advanced (or delayed) at the time of update. For instance, when the time is advanced by 1 second, the correction degree is +1 second. Also, when the time is delayed by 2 seconds, the correction degree is −2 seconds. The allowable correction degree 222 is an allowable range of correction.

In the example shown in FIG. 4, correction in a direction in which the time advances is prohibited in order to reliably protect data, whose WORM guarantee term has not yet expired. When the time of the WORM management clock 128 is advanced, the WORM guarantee term will expire early. When the time of the WORM management clock 128 is intentionally or erroneously set earlier than the actual time, this may result in a situation where data, whose WORM guarantee term has not yet expired in actuality, is recognized as data whose WORM guarantee term has expired, and the WORM attribute is reset. In order to prevent such a situation, the correction in the direction in which the time advances is prohibited.

The allowable correction degree in the direction, in which the time is delayed, is determined in accordance with the accuracy of the embedded clocks.

Figure 5:
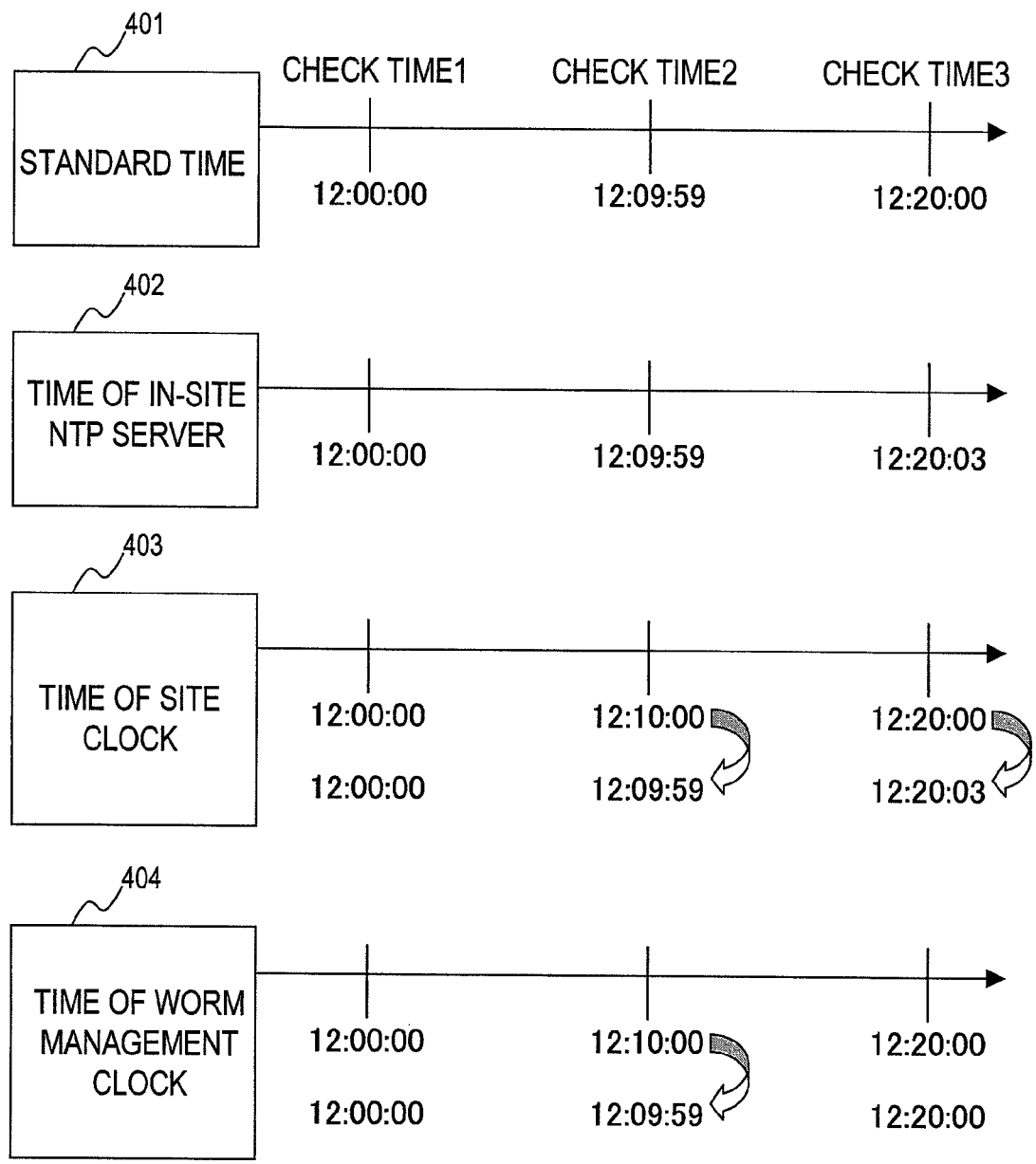
FIG. 5 is an explanatory diagram of time update at check times according to the first embodiment of this invention.

FIG. 5 is an explanatory diagram of time update at check times according to the first embodiment of this invention.

A standard time 401 is the actual time (for instance, Japanese Standard Time).

A time of the in-site NTP server 402 is a time held by the in-site NTP server 5. The time of the in-site NTP server 402 is transmitted to each of the devices in the computer system using the NTP. The in-site NTP server 5 can not directly obtain the standard time 401. Therefore, the time of the in-site NTP server 402 may deviate from the standard time 401.

A time of the site clock 403 is a time held by the site clock 129.

A time of the WORM management clock 404 is a time held by the WORM management clock 128.

First, a check time 1 is reached (in other words, the time of the site clock becomes "12:00:00"). In the example shown in FIG. 5, at this point in time, the standard time 401, the time of the in-site NTP server 402, the time of the site clock 403, and the time of the WORM management clock 404 all indicate "12:00:00". Therefore, it is not required to perform correction on each of the clocks.

Next, a check time 2 is reached (in other words, the time of the site clock becomes "12:10:00").

At this point in time, the standard time 401 and the time of the in-site NTP server 402 both indicate "12:09:59".

On the other hand, the time of the site clock 403 and the time of the WORM management clock 404 are each "12:10:00" and are 1 second earlier than the time of the in-site NTP server 402.

In this state, the time "12:09:59" is transmitted from the in-site NTP server 5.

The time of the site clock 403 is unconditionally updated to the time as "12:09:59".

The time of the WORM management clock 404 also receives the time "12:09:59" in a like manner and it is found that the correction degree is −1 second. As described above, in this example, the allowable correction degree 222 in the WORM management clock management information 213 is set in a range of from −2 seconds to +0 second. In other words, the correction degree "−1 second" is within the range of the allowable correction degree 222, so this time correction is regarded as not time tampering but correction of a time deviation occurred due to a hardware reason. As a result, the time correction is permitted and the time of the WORM management clock 404 is updated to "12:09:59".

Next, a check time 3 is reached (in other words, the time of the site clock becomes "12:10:00").

At this point in time, the time of the in-site NTP server 402 indicates "12:20:03". On the other hand, the time of the site clock 403 and the time of the WORM management clock 404 both indicate "12:20:00". Also, the standard time 401 is "12:20:00".

Like in the case of the check time 2, the time of the site clock 403 is unconditionally synchronized to the time of the in-site NTP server 402 and is updated to "12:20:03".

On the other hand, the time of the WORM management clock 404 also receives the time "12:20:03" from the in-site NTP server 5. In this case, however, the correction degree is +3 seconds, which is outside the range of the allowable correction degree 222. Therefore, this update is regarded as improper update and the time correction is not permitted.

In FIG. 5, at the check time 3, the standard time 401 is "12:20:00". In other words, the time of the in-site NTP server 402 is 3 seconds earlier than the standard time 401. If the time of the WORM management clock 404 is corrected so as to coincide with the time of the in-site NTP server 402, the time of the WORM management clock 404 becomes 3 seconds earlier than the standard time 401. In this case, the end of the WORM guarantee term is reached 3 seconds earlier with respect to the actual time (in other words, the standard time 401). Accordingly, there arises a danger that data, whose WORM guarantee term has not yet expired in actuality, may be tampered.

According to this embodiment, however, correction to advance the time of the WORM management clock 404 is prohibited. Therefore, the time of the WORM management clock 404 is prevented from becoming earlier than the standard time 401. As a result, there will never arise a danger that data, whose WORM guarantee term has not yet expired, may be tampered.

Figure 6:
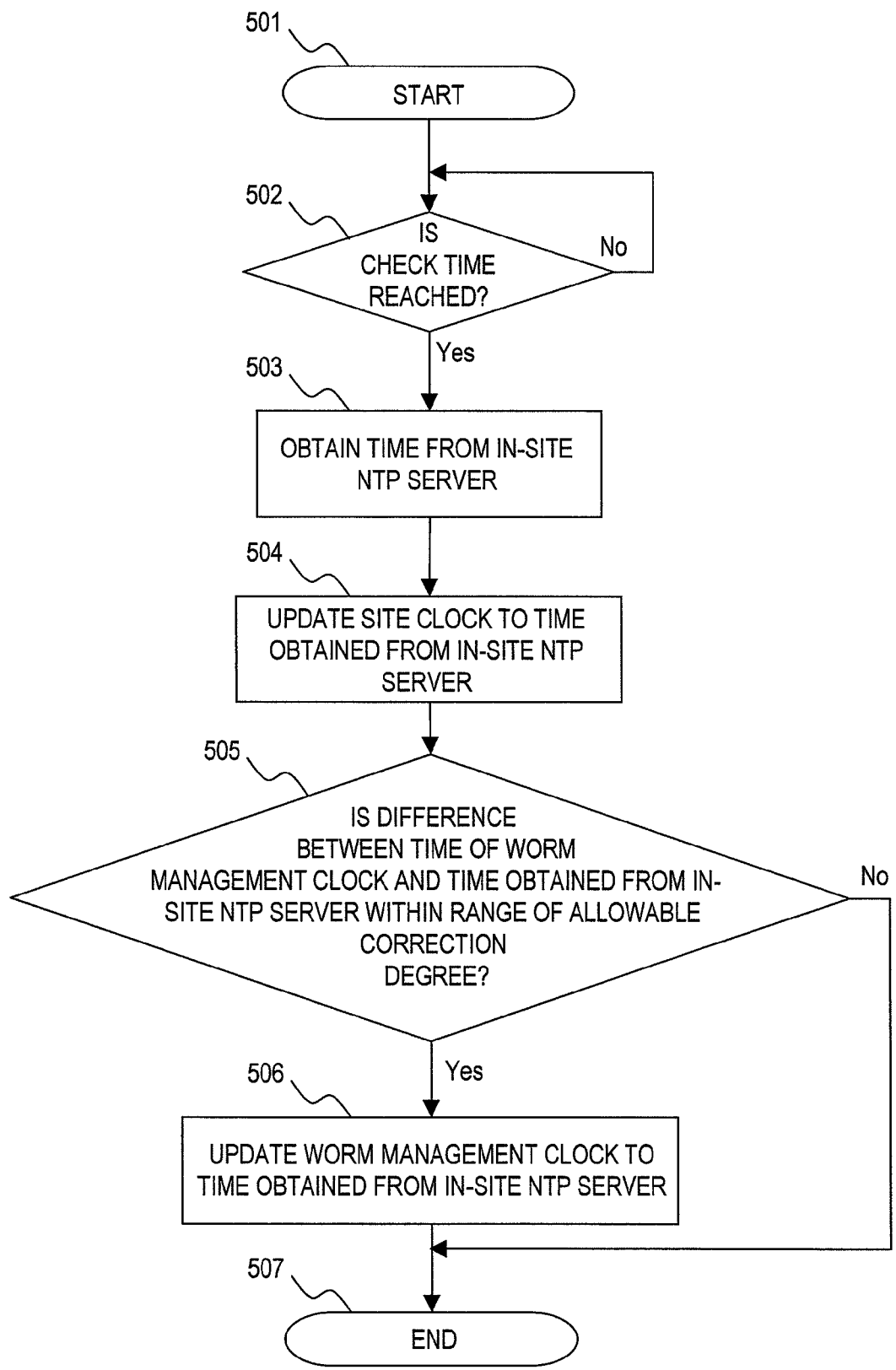
FIG. 6 is a flowchart of processing executed at the time of update of a WORM management clock and a site clock according to the first embodiment of this invention.

FIG. 6 is a flowchart of processing executed at the time of update of the WORM management clock 128 and the site clock 129 according to the first embodiment of this invention.

The flowchart shown in FIG. 6 is executed by the time update program 212. In FIG. 6, the NTP client program 204, the site clock management program 206, and the WORM management clock management program 211 each operate as a subroutine of the time update program 212.

In a step 501, the update processing is started. Then, in a step 502, the site clock management program 206 judges whether the current time has reached a check time.

When doing so, the site clock management program 206 may refer to the time indicated by the site clock 129 as the current time or may refer to the time indicated by the WORM management clock 128 as the current time.

In this embodiment, the time indicated by the site clock 129 is referred to as the current time.

Also, in this embodiment, intervals between check times are set with reference to the check interval 221 in the WORM management clock management information 213. However, the check intervals for update of the site clock 129 and the check intervals for update of the WORM management clock 128 may be different from each other.

Also, the check intervals for the update of the WORM management clock 128 may be set as irregular intervals. For instance, by updating the time of the WORM management clock 128 at random intervals, robustness against time tampering is improved.

When it is judged in the step 502 that the current time has not reached a check time, the processing returns to the step 502 and it is judged again whether a check time is reached.

On the other hand, when it is judged in the step 502 that the current time has reached a check time, the processing proceeds to a step 503 in which the NTP client program 204 obtains time information at that point in time from the in-site NTP server 5.

Next, in a step 504, the site clock management program 206 unconditionally reflects the time obtained in the step 503 in the site clock 129. More specifically, the site clock management program 206 corrects the time of the site clock 129 so as to coincide with the time obtained in the step 503.

Next, in a step 505, the WORM management clock management program 211 computes a difference between the time obtained in the step 503 and the time of the WORM management clock 128 at that point in time and judges whether the computed difference is within the range of the allowable correction degree 222 in the WORM management clock management information 213.

When it is judged in the step 505 that the time difference is within the range of the allowable correction degree 222, the time correction is permitted. Therefore, in a step 506, the WORM management clock management program 211 updates the WORM management clock 128 to the time obtained from the in-site NTP server 5. Then, in a step 507, the processing is ended.

On the other hand, when it is judged in the step 505 that the time difference is outside the range of the allowable correction degree, the time correction is prohibited. Therefore, in the step 507, the processing is ended without updating the WORM management clock 128.

Figure 7:
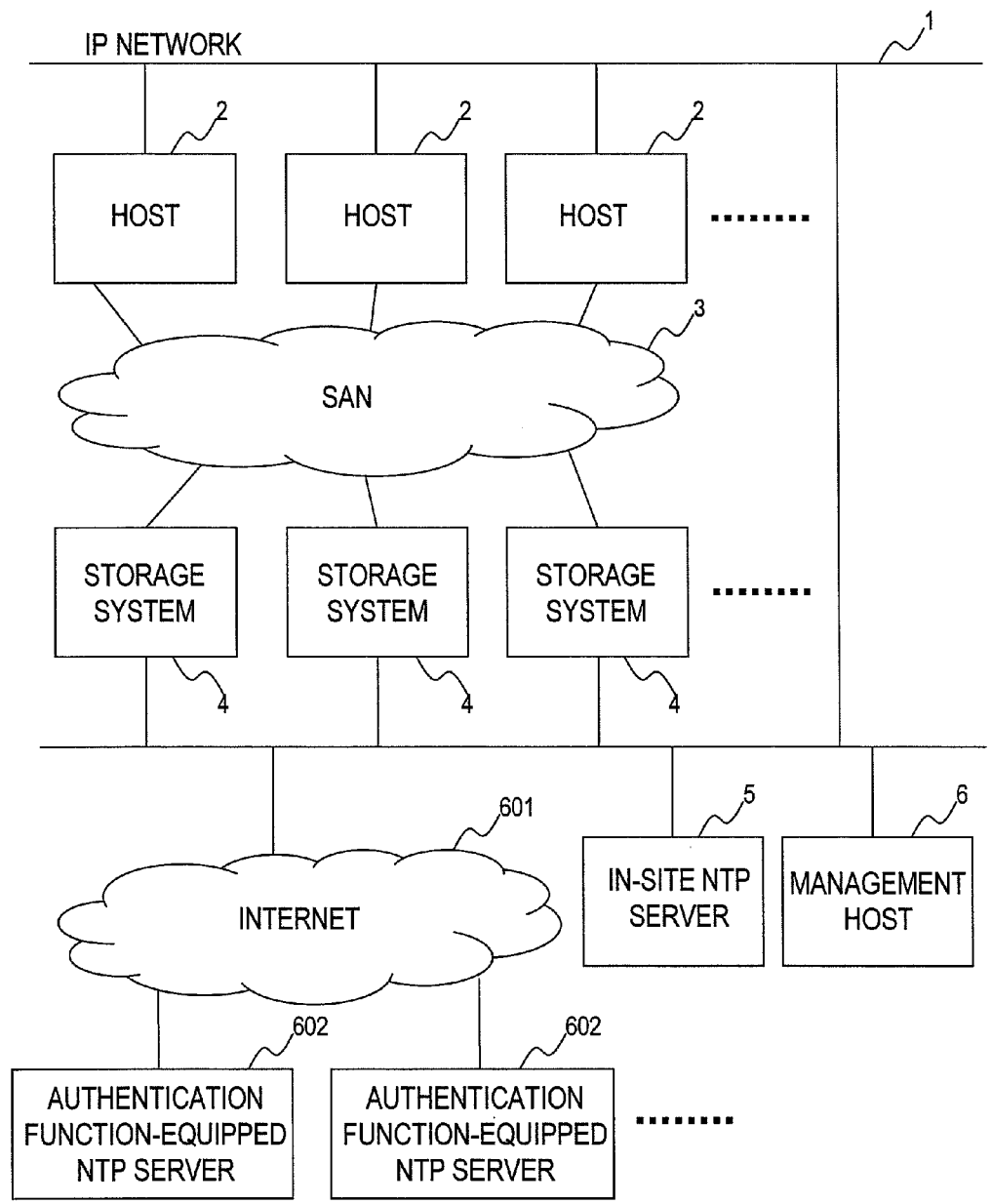
FIG. 7 is a block diagram showing a configuration of a computer system according to a second embodiment of this invention.

FIG. 7 is a block diagram showing a configuration of a computer system according to a second embodiment of this invention.

The configuration of the computer system according to the second embodiment is the same as the configuration of the computer system according to the first embodiment shown in FIG. 1 except that the Internet 601 is connected to an IP network 1 and one or more authentication function-equipped NTP servers 602 are connected to the Internet 601.

Devices connected to the IP network 1 are capable of communicating with the authentication function-equipped NTP servers 602 through the IP network 1 and the Internet 601. In this embodiment, storage systems 4 communicate with the authentication function-equipped NTP servers 602 and obtain time information therefrom.

The authentication function-equipped NTP servers 602 will be described later with reference to FIG. 10.

The IP network 1, hosts 2, a SAN 3, an in-site NTP server 5, and a management host 6 are completely the same as those shown in FIG. 1 and therefore the detailed description thereof will be omitted.

A configuration of each storage system 4 is the same as the configuration of the storage system 4 according to the first embodiment shown in FIG. 2. However, programs and management information stored in a memory 127 are partially different from those according to the first embodiment.

Figure 8:
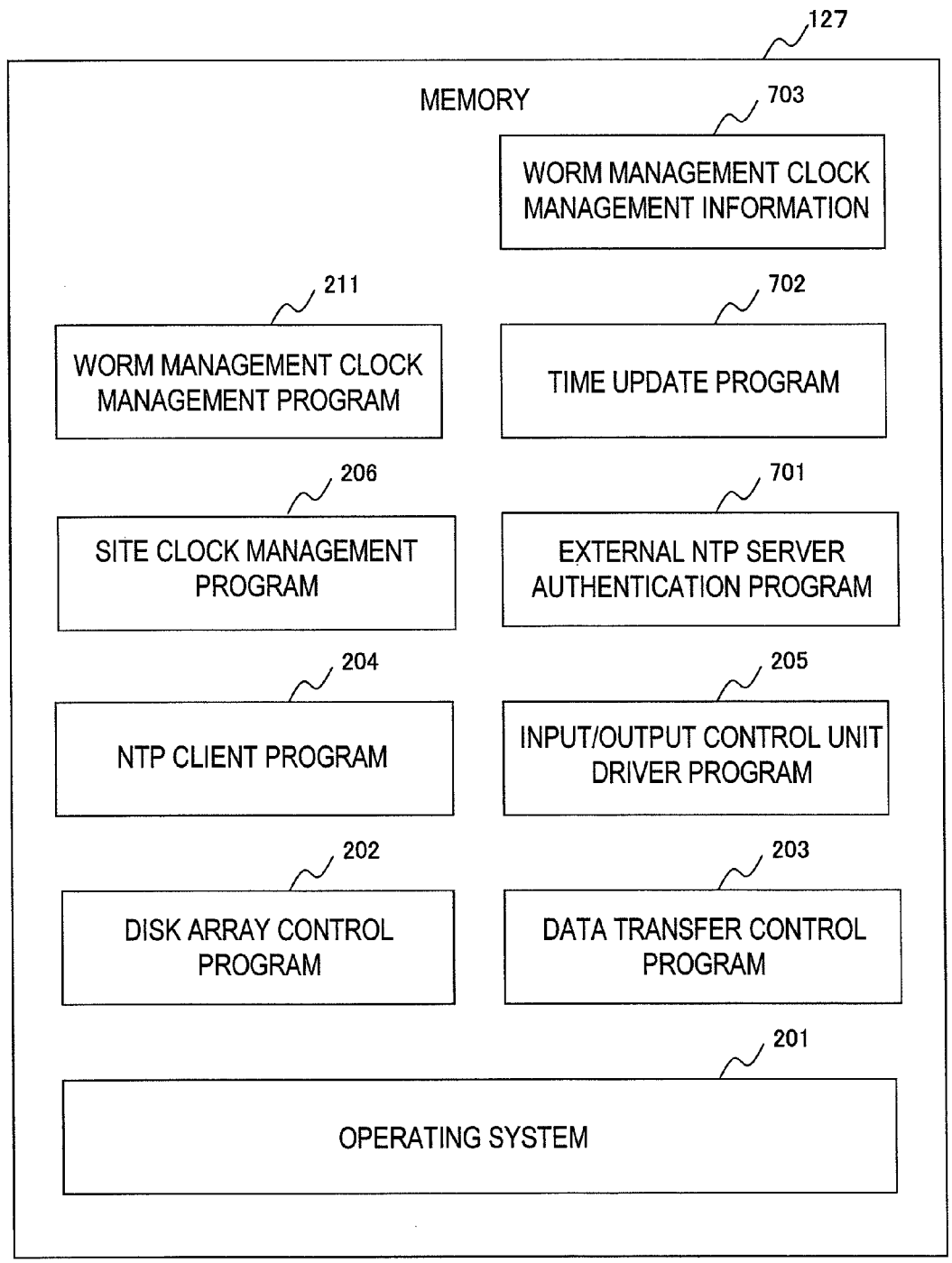
FIG. 8 is an explanatory diagram of a memory according to the second embodiment of this invention.

FIG. 8 is an explanatory diagram of the memory 127 according to the second embodiment of this invention.

A configuration of the memory 127 according to the second embodiment is the same as the configuration of the memory 127 according to the first embodiment shown in FIG. 3 except that an external NTP server authentication program 701 for confirming the authentication of the authentication function-equipped NTP servers 602 from the storage system 4 is added. However, the contents of a time update program 702 and the contents of WORM management clock management information 703 are respectively different from the contents of the time update program 212 and the contents of the WORM management clock management information 213 according to the first embodiment.

A WORM management clock management program 211, a site clock management program 206, an NTP client program 204, an input/output control unit driver program 205, a disk array control program 202, a data transfer control program 203, and an operating system 201 are the same as those according to the first embodiment shown in FIG. 3 and therefore the detailed description thereof will be omitted.

FIG. 9 is an explanatory diagram of the WORM management clock management information 703 according to the second embodiment of this invention.

The WORM management clock management information 703 contains various items named "check interval" 711, "authentication function-equipped NTP server IP address" 712, and "authentication function-equipped NTP server public key" 713.

The check interval 711 shows the intervals of update of the WORM management clock 128.

The authentication function-equipped NTP server IP address 712 shows the IP address of the authentication function-equipped NTP server 602 connected to the Internet 601.

The authentication function-equipped NTP server public key 713 shows the public key set in the authentication function-equipped NTP server 602.

When plural authentication function-equipped NTP servers 602 are connected to the Internet 601, plural authentication function-equipped NTP servers 602 may be registered in the WORM management clock management information 703. FIG. 9 shows a state where two authentication function-equipped NTP servers 602 (first authentication function-equipped NTP server 602 and second authentication function-equipped NTP server 602) are registered.

In the WORM management clock management information 703, more authentication function-equipped NTP servers 602 may be registered. By registering plural authentication function-equipped NTP servers 602, when one authentication function-equipped NTP server 602 is stopped, another authentication function-equipped NTP server 602 can be used.

An administrator can select reliable authentication function-equipped NTP servers 602 and register them in the WORM management clock management information 703 in advance. When doing so, it is possible to register an authentication function-equipped NTP server 602 having higher reliability in a higher place. In the example shown in FIG. 9, the reliability of the first authentication function-equipped NTP server 602 is the highest and the reliability of the second authentication function-equipped NTP server 602 is the next highest.

In this embodiment, each of the authentication function-equipped NTP servers 602 is authenticated using its public key. However, the authentication function-equipped NTP server 602 may be authenticated using another method. In this case, in the WORM management clock management information 703, information for authenticating the authentication function-equipped NTP server 602 is stored.

In this embodiment, the check interval 711 is fixed and each clock is updated at regular intervals, although the clock update may be performed at random intervals.

Also, although not shown in FIG. 9, by setting an allowable correction degree 222 like in the first embodiment of this invention, it becomes possible to make the system more robust. In this case, the allowable correction degree 222 is stored in the WORM management clock management information 703.

Figure 10:
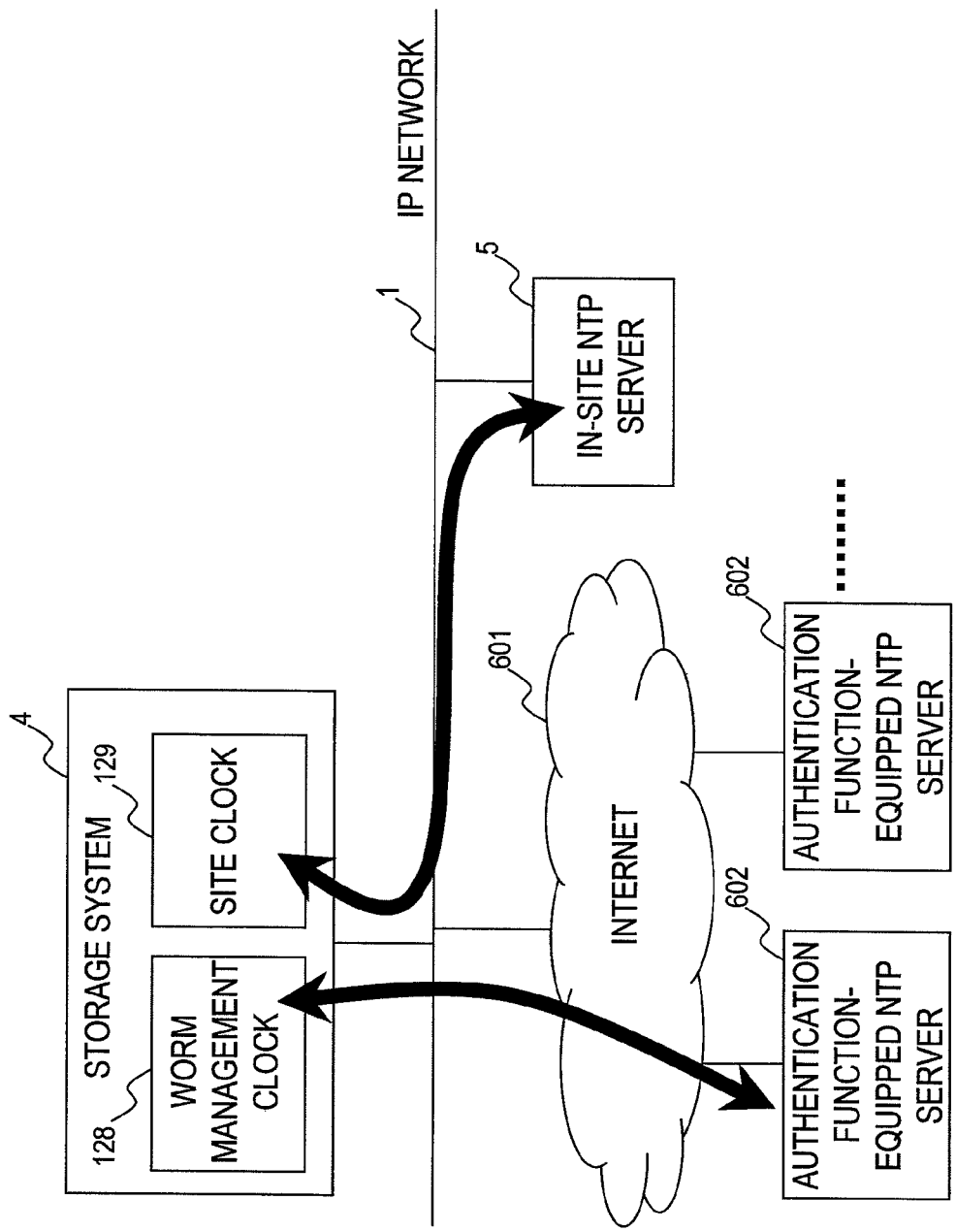
FIG. 10 is an explanatory diagram of time update according to the second embodiment of this invention.

FIG. 10 is an explanatory diagram of time update according to the second embodiment of this invention.

The storage system 4 comprises a WORM management clock 128 and a site clock 129.

Among those clocks, the WORM management clock 128 is updated only by the authentication function-equipped NTP server 602 connected through the Internet 601.

In the WORM management clock management information 703, information concerning the authentication function-equipped NTP server 602 is registered in advance.

When obtaining a time from the authentication function-equipped NTP server 602, the storage system 4 judges whether the authentication function-equipped NTP server 602 is registered in the WORM management clock management information 703. When a result of this judgment is positive, the WORM management clock 128 is updated in the manner shown in FIG. 11.

As to the site clock 129, it is more important that the clock 129 is synchronized with the clocks of other devices in the site than that the clock 129 is adjusted to the correct time given by the authentication function-equipped NTP server 602. Consequently, the site clock 129 is updated with reference to a time given by the in-site NTP server 5.

When doing so, like the storage system 4, every device or the in-site NTP server 5 in the computer system may obtain a time from the authentication function-equipped NTP server 602, thereby having the site clock 129 indicate a time that is the same as the time of the WORM management clock 128.

Also, the time in the computer system may be synchronized with the time of the WORM management clock 128 that holds the correct time obtained from the authentication function-equipped NTP server 602.

Figure 11:
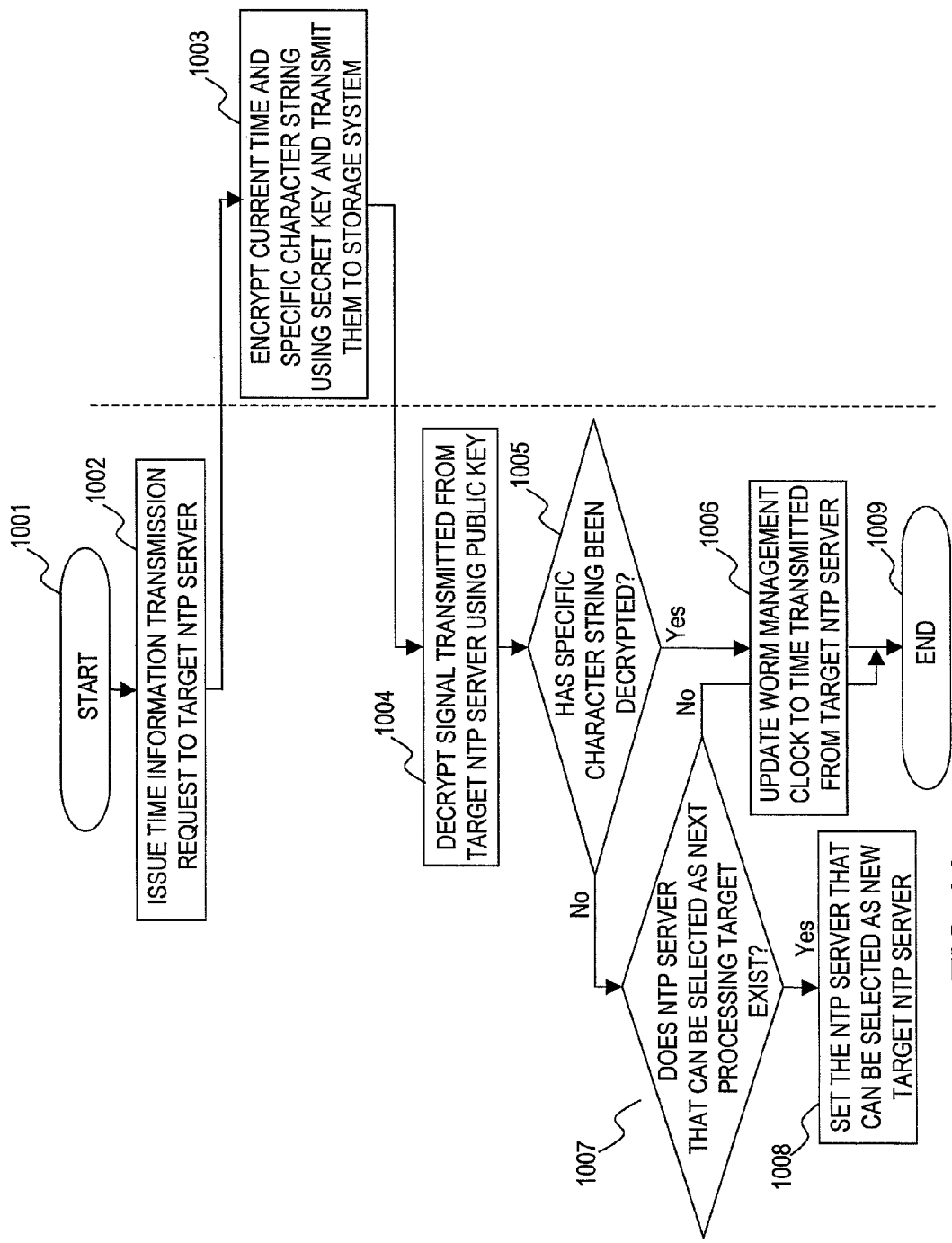
FIG. 11 is a flowchart of processing executed at the time of update of a WORM management clock according to the second embodiment of this invention.

FIG. 11 is a flowchart of processing executed at the time of update of the WORM management clock 128 according to the second embodiment of this invention.

In FIG. 11, with respect to a broken line, processing executed by the storage system 4 is shown on the left side and processing executed by the authentication function-equipped NTP server 602 is shown on the right side.

The processing shown in FIG. 11 on the left side with respect to the broken line is executed by the time update program 702. In FIG. 11, the NTP client program 204, the WORM management clock management program 211, and the external NTP server authentication program 701 each operate as a subroutine of the time update program 702.

In a step 1001, the processing for updating the WORM management clock 129 is started. Then, in a step 1002, the NTP client program 204 issues a time information transmission request to a target authentication function-equipped NTP server 602 among the authentication function-equipped NTP servers 602 registered in the WORM management clock management information 703.

Then, in a step 1003, the authentication function-equipped NTP server 602 that received the time information transmission request encrypts the current time and a specific character string using a secret key and transmits the encrypted current time and specific character string to the storage system 4.

In this embodiment, as described above, the NTP server is authenticated using its public key, although another method may be used to confirm that the NTP server is a server registered in advance.

Also, the specific character string used here may be a character string transmitted from the storage system 4 or may be another character string determined in advance (character string or the like indicating the authentication function-equipped NTP server 602, for instance).

Then, the storage system 4 receives a signal transmitted in the step 1003 from the target authentication function-equipped NTP server 602. Then, in a step 1004, the external NTP server authentication program 701 decrypts the received signal using the public key of the target authentication function-equipped NTP server 602. Here, the public key of the target authentication function-equipped NTP server 602 is registered in the WORM management clock management information 703 in advance.

Next, in a step 1005, the external NTP server authentication program 701 judges whether the specific character string has been decrypted with reference to a result of the decryption in the step 1004.

When it is judged in the step 1005 that the specific character string has not been decrypted, this means that the public key registered in the WORM management clock management information 703 and the secret key possessed by the authentication function-equipped NTP server 602 that is currently under processing do not correspond to each other, in other words, the authentication for confirming that the target authentication function-equipped NTP server 602 is a server registered has ended in failure.

In this case, the processing proceeds to a step 1007 in which the external NTP server authentication program 701 judges whether an authentication function-equipped NTP server that can be selected as the next processing target is registered in the WORM management clock management information 703. More specifically, for instance, the external NTP server authentication program 701 judges whether an authentication function-equipped NTP server 602 that is not yet processed exists in the WORM management clock management information 703.

When it is judged in the step 1007 that every authentication function-equipped NTP server 602 registered has been processed, this means that there exists no authentication function-equipped NTP server that can be selected as the next processing target. Therefor, the processing proceeds to a step 1009 in which the processing for updating the WORM management clock 128 is ended.

On the other hand, when it is judged in the step 1007 that an authentication function-equipped NTP server 602 that can be selected as the next processing target is registered in the WORM management clock management information 703, the processing proceeds to a step 1008 in which the external NTP server authentication program 701 sets the authentication function-equipped NTP server 602 as a new target authentication function-equipped NTP server 602. Then, the processing returns to the step 1002.

On the other hand, when it is judged in the step 1005 that the specific character string has been decrypted, this means that the target authentication function-equipped NTP server 602 is confirmed to be a server registered in the WORM management clock management information 703. Therefore, the processing proceeds to a step 1006 in which the WORM management clock management program 211 updates the WORM management clock 128 to the time transmitted from the target authentication function-equipped NTP server 602. Then, in the step 1009, the processing for updating the WORM management clock 128 is ended.

Figure 12:
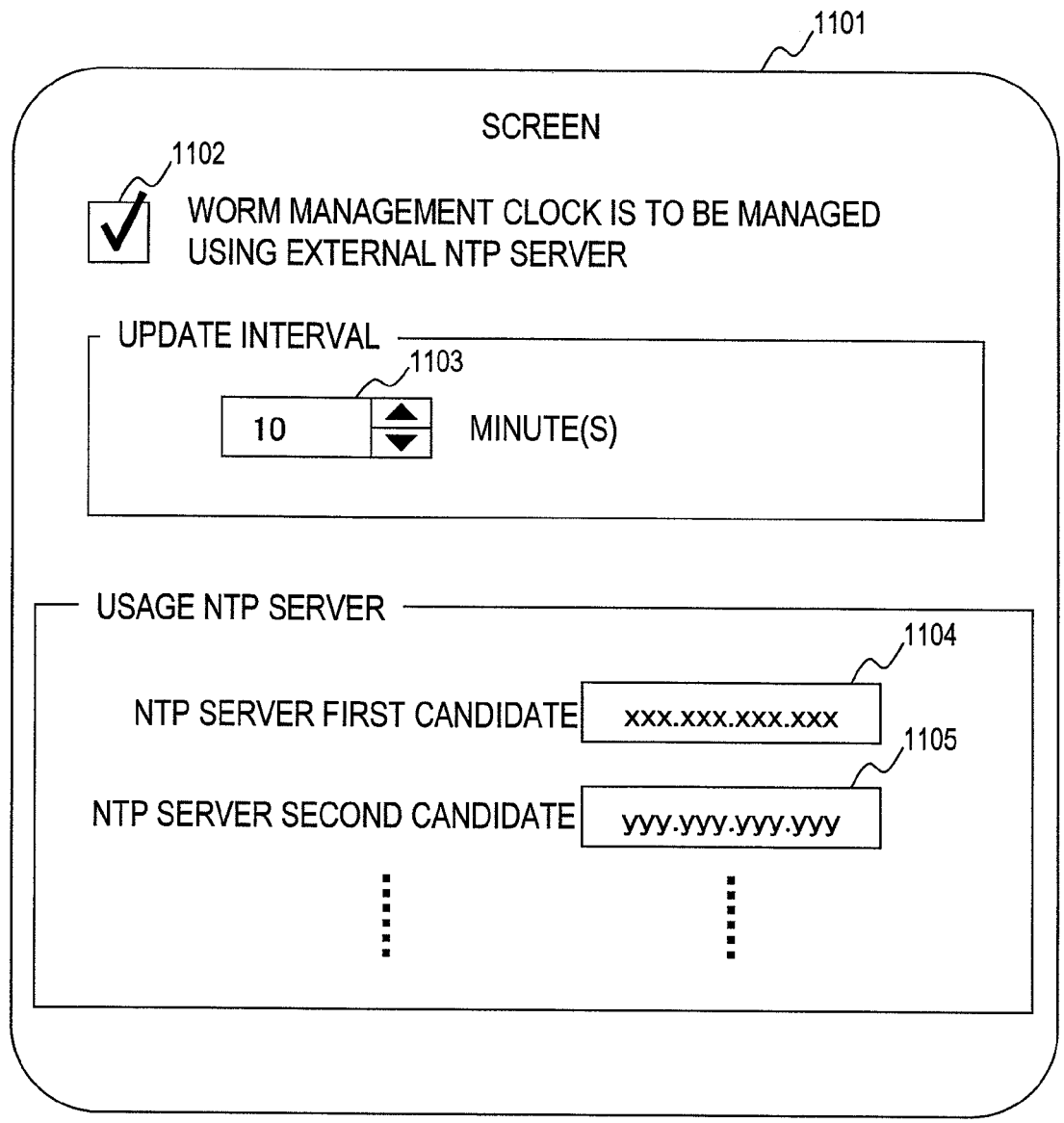
FIG. 12 is an explanatory diagram of a management screen according to the second embodiment of this invention.

FIG. 12 is an explanatory diagram of a management screen according to the second embodiment of this invention.

The management screen 1101 is a screen displayed on an input/output device (not shown) of the management host 6. The administrator of the computer system according to this embodiment is capable of making settings concerning the update of the WORM management clock 128 by operating the management screen 1101 and inputting information thereinto.

The management screen 1101 is composed of a check button 1102, an update interval setting field 1103, and usage NTP server setting fields 1104 and 1105.

The check button 1102 is used to make a setting as to whether the WORM management clock 128 is to be managed using the external authentication function-equipped NTP server 602.

For instance, by operating the check button 1102 with a mouse (not shown), it is possible to perform switching between "ON" and "OFF" of the check button 1102. For instance, when the check button 1102 is set "ON", a check mark is displayed on the check button 1102. FIG. 12 shows a state where the check button 1102 is set "ON".

When the check button 1102 is set "ON", the authentication function-equipped NTP server 602 is used to update the WORM management clock and the flowchart shown in FIG. 11 is executed.

When the computer system according to this embodiment is not connected to the Internet 601 or when there exists no authentication function-equipped NTP server 602 that is reliable, for instance, it is possible to set the check button 1102 "OFF".

The update interval setting field 1103 is used to set intervals of update of the WORM management clock 128. FIG. 12 shows a state where the intervals, at which the WORM management clock 128 is updated, are set to 10 minutes. The administrator is capable of setting arbitrary update intervals by operating the update interval setting field 1103. The set update intervals are registered as the check interval 711 in the WORM management clock management information 703.

The usage NTP server setting fields 1104 and 1105 are used to register the authentication function-equipped NTP servers 602 that are to be used at the time of the update of the WORM management clock 128. In the usage NTP server setting fields 1104 and 1105, the IP addresses of the authentication function-equipped NTP servers 602 are inputted. The IP addresses inputted here are each registered as the authentication function-equipped NTP server IP address 712 in the WORM management clock management information 703.

In FIG. 12, the usage NTP server setting field 1104 corresponds to an NTP server first candidate and the usage NTP server setting field 1105 corresponds to an NTP server second candidate. In the flowchart shown in FIG. 11, the authentication function-equipped NTP servers 602 are processed in order, with the authentication function-equipped NTP server 602 registered as the NTP server first candidate (in other words, the authentication function-equipped NTP server in the highest place) being processed first. For instance, the authentication function-equipped NTP server 602 closer to the computer system on the Internet 601 is set as a candidate in a higher place.

For instance, the IP address set in the usage NTP server setting field 1104 for the NTP server first candidate is registered as the first authentication function-equipped NTP server IP address 712 A and the IP address set in the usage NTP server setting field 1105 for the NTP server second candidate is registered as the second authentication function-equipped NTP server IP address 712 B.

It should be noted that in the management screen 1101, more usage NTP server setting fields may be provided.

Also, authentication function-equipped NTP servers 602 may be selected from among authentication function-equipped NTP servers 602 determined in advance.

What is claimed is:

1. A storage system coupled to at least one time server among a plurality of time servers through a network, comprising:
    a first time information holding unit that holds first time information to be used to manage an update prohibition attribute of data stored in the storage system;

a second time information holding unit that holds second time information to be used to establish time synchronization with a device coupled to the network; and a time update unit that manages the first time information and the second time information, wherein the time update unit:
  authenticates the at least one time server,
  receives a third time information from the at least one time server,
  updates the second time information based on the third time information,
  compares a time indicated by the first time information with a time indicated by the third time information, and
  updates the first time information based on the third time information upon the successful authentication of the at least one time server and only if the time indicated by the third time information is earlier than the time indicated by the first time information;

wherein the update unit receives the third time information at random intervals.

2. The storage system of claim 1 wherein the update unit updates the first time information if a difference between the first time information and the third time information is within a predetermined range.

3. The storage system of claim 2 wherein the predetermined range extends from about −2 seconds to about 0 second.

4. The storage system according to claim 1 wherein the first time information holding unit is a first clock and the second time information holding unit is a second clock, the second clock being independent of the first clock.

5. The storage system according to claim 1 wherein one of the first time information holding unit or the second time information holding unit is a clock and the other thereof is a storage area in which a difference between the first time information and the second time information is held.

6. The storage system according to claim 1 wherein the time update unit receives the third time information from another one of the time servers when the authentication of the at least one of the time servers ends in failure and authenticates the another one of the time servers that transmitted the third time information.

7. The storage system according to claim 1 wherein the third time information is encrypted using a secret key corresponding to a predetermined public key and wherein the time update unit,
  decrypts the third time information using the predetermined public key when receiving the third time information, and
  judges that the authentication of the at least one time server that transmitted the third time information ends in success when the decryption ends in success.

8. A computer system comprising:
  a storage system;
  a plurality of time servers; and
  a network that couples the storage system and at least one of the time servers to each other,
  the storage system comprising:
    a first time information holding unit that holds first time information to be used to manage an update prohibition attribute of data stored in the storage system;
    a second time information holding unit that holds second time information to be used to establish time synchronization with a device coupled to the network; and
    a time update unit that manages the first time information and the second time information wherein the at least one of the time servers transmits a third time information to the storage system, and
  the time update unit:
    authenticates the at least one of the time servers,
    receives the third time information from the at least one of the time servers,
    updates the second time information based on the third time information,
    compares a time indicated by the first time information with a time indicated by the third time information, and
    updates the first time information based on the third time information upon the successful authentication of the at least one of the time servers and only if the time indicated by the third time information is earlier than the time indicated by the first time information;
    wherein the update unit receives the third time information at random intervals.

9. The computer system of claim 8 wherein the update unit updates the first time information if a difference between the first time information and the third time information is within a predetermined range.

10. The computer system of claim 9 wherein the predetermined range extends from about −2 seconds to about 0 second.

11. The computer system according to claim 8 wherein the first time information holding unit is a first clock and the second time information holding unit is a second clock that is independent of the first clock.

12. The computer system according to claim 8 wherein one of the first time information holding unit and the second time information holding unit is a clock and the other thereof is a storage area in which a difference between the first time information and the second time information is held.

13. The computer system according to claim 8 wherein the time update unit receives the third time information from another one of the time servers when the authentication of the at least one of the time servers ends in failure and authenticates the another one of the time servers that transmitted the third time information.

14. The computer system according to claim 8 wherein the third time information is encrypted using a secret key corresponding to a predetermined public key and
  wherein the time update unit,
    decrypts the third time information using the predetermined public key when receiving the third time information; and
    judges that the authentication of the at least one time server that transmitted the third time information ends in success when the decryption ends in success.

* * * * *